United States Patent

Frelund

[11] 4,270,499
[45] Jun. 2, 1981

[54] DIESEL ENGINE PRECOMBUSTION CHAMBERS

[75] Inventor: Arthur R. Frelund, Okemos, Mich.
[73] Assignee: General Motors Corporation, Detroit, Mich.
[21] Appl. No.: 35,533
[22] Filed: May 3, 1979
[51] Int. Cl.³ .............................................. F02B 19/18
[52] U.S. Cl. .................................... 123/293; 123/260; 123/261; 123/263
[58] Field of Search ........... 123/32 SP, 32 ST, 191 S, 123/191 SP, 32 C, 32 D, 32 K, 32 L, 32 AA, 30 D

[56] References Cited

U.S. PATENT DOCUMENTS

| 1,818,339 | 8/1931 | Lang . | |
|---|---|---|---|
| 2,970,584 | 2/1961 | Wünsche et al. | 123/32 D |
| 3,970,053 | 7/1976 | Goodacre | 123/32 SP |
| 4,054,108 | 10/1977 | Gill | 123/55 R |
| 4,122,804 | 10/1978 | Kingsbury et al. | 123/32 ST |
| 4,122,805 | 10/1978 | Kingsbury et al. | 123/32 ST |

FOREIGN PATENT DOCUMENTS

| 806071 | 6/1951 | Fed. Rep. of Germany | 123/32 D |
| 1031574 | 6/1958 | Fed. Rep. of Germany | 123/32 L |
| 1075893 | 2/1960 | Fed. Rep. of Germany | 123/32 K |

Primary Examiner—Charles J. Myhre
Assistant Examiner—Andrew M. Dolinar
Attorney, Agent, or Firm—Robert J. Outland

[57] ABSTRACT

A precombustion type diesel engine having a modified and improved flame cup and precombustion chamber arrangement wherein a single side-opening passage in the floor of the flame cup is provided with dual throats connecting with the prechamber. The primary opening or throat controls swirl development during gas inflow to the prechamber while the secondary opening or throat allows early discharge of initial combustion products to the main combustion chamber for improved secondary mixing and reduced particulate emissions.

8 Claims, 3 Drawing Figures

DIESEL ENGINE PRECOMBUSTION CHAMBERS

TECHNICAL FIELD

This invention relates to diesel engines and, more particularly, to precombustion chambers for use in diesel engines. In its more particular aspects, the invention relates to improved precombustion chamber arrangements for automotive diesel engines.

BACKGROUND OF THE INVENTION

The commercial use of diesel engines of the precombustion chamber (prechamber) type in automotive and related applications has extended over many years. Recently, applications of such engines in automobiles and other automotive vehicles have increased and, in view of increasingly rigid future mileage standards for vehicles in the United States and the increasing prices for petroleum fuel, it appears that a further substantial increase in the use of such diesel engines is likely.

Many types of diesel engine prechamber arrangements have been utilized by various engine manufacturers. One currently utilized engine arrangement and certain combustion chamber and precombustion chamber arrangements for use in such an engine are disclosed in U.S. Pat. Nos. 4,054,108 Gill; 4,122,804 Kingsbury, Thurston and Chapman; and 4,122,805 Kingsbury and Thurston, all assigned to the assignee of the present invention.

SUMMARY OF THE INVENTION

The present invention provides a modified and improved flame cup and precombustion chamber arrangement primarily intended for use in place of the arrangements shown in U.S. Pat. Nos. 4,122,804 and 4,122,805 in engines of the type shown in U.S. Pat. No. 4,054,108. However, use of the improved flame cup and precombustion chamber is not limited to the specfic combustion chamber arrangements or engine forms shown in the above-mentioned patents, but may find application in a wide range of engine types and arrangements within the scope of the appended claims.

A feature of the present invention is that the flame cup, which defines the bottom wall of the precombustion chamber, includes a side outlet passage to the main combustion chamber with dual openings into the prechamber area.

Another feature is that the flame cup passage has a primary opening portion at one end connecting with the prechamber and arranged to control air swirl developed therein on the compression stroke of the engine and a secondary opening portion connecting with the prechamber at an intermediate point of the passage and adapted to encourage the prompt discharge of burning air-fuel mixture from the zone of heaviest fuel concentration in the precombustion chamber into the main combustion chamber and thereby provide improved seocondary mixing with resultant improvements in power and reduced smoke.

Yet, another feature of the invention is that the primary and secondary opening portions are arranged at differing angles to the main passage portion such that air flow into the precombustion chamber is required to turn at a sharper angle to enter the secondary opening portion than to enter the primary opening portion whereby inlet flow preferentially passes through the primary opening portion into the precombustion chamber.

Still another feature is that the fuel injector is arranged to direct fuel into the precombustion chamber in a manner to provide a zone of concentrated fuel-rich mixture in the volume adjacent the secondary opening portion.

An additional feature of the invention is that a glow plug is provided which extends into the precombustion chamber in said zone of concentrated fuel-rich mixture.

The dual opening or dual throat prechamber flame cup of the present invention provides a partial separation of the functions of control of prechamber swirl and prechamber cavity discharge. The primary openings or throat portion is positioned to direct and control inlet air flow so as to determine the swirl rate of air forced into the precombustion chamber on the piston compression stroke. The secondary opening or throat portion provides an additional path, located adjacent the area of heaviest fuel concentration and the point of initial combustion in the prechamber, through which the "heavy" fuel molecules of initial combustion are directed and forced by the pressure of combustion into the main chamber through the secondary opening and the main prechamber passage. This action provides a higher degree of secondary mixing and yields improved power with a reduction in particulate emissions as compared to certain previous arrangements.

These and other features and advantages of the invention will be more fully understood from the following description of a preferred embodiment taken together with the accompanying drawing.

BEST MODE FOR CARRYING OUT THE INVENTION

Figure 1:
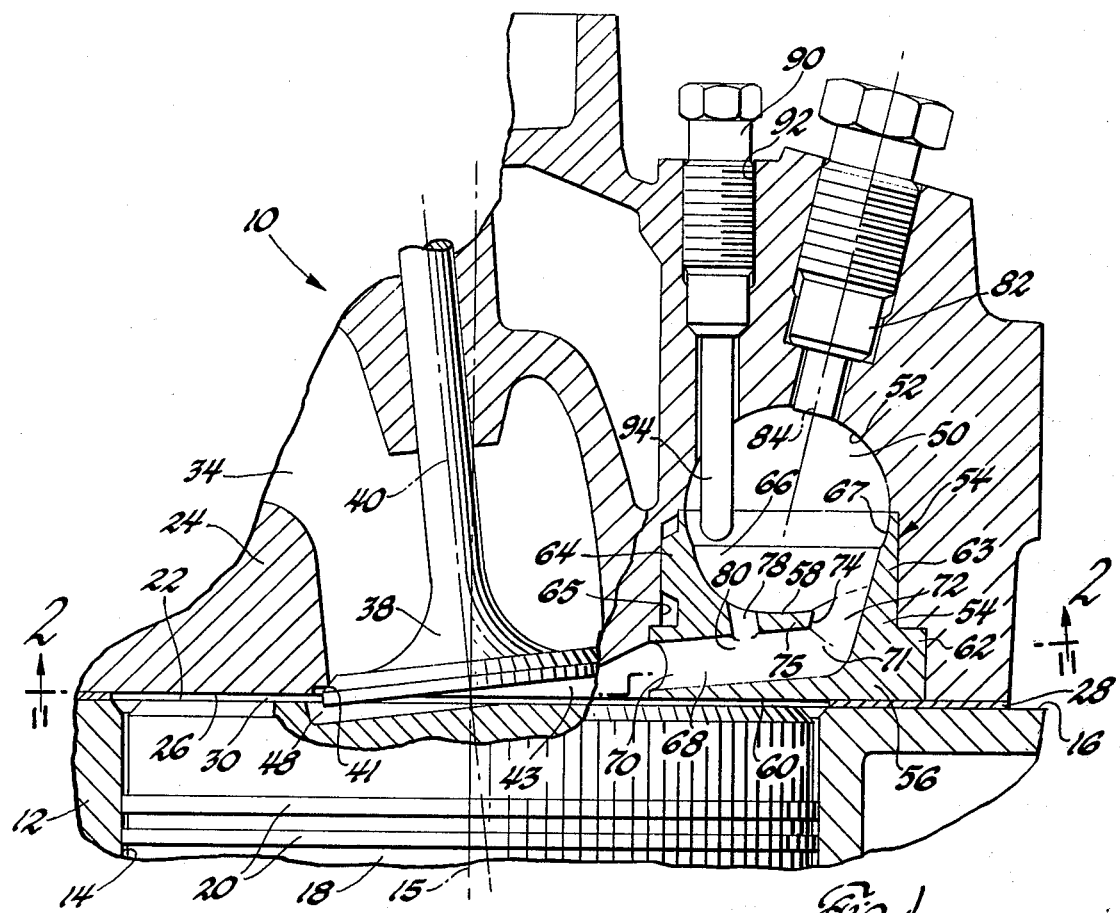
FIG. 1 is a fragmentary, transverse cross-sectional view along the axis of a cylinder of an internal combustion engine formed in accordance with a preferred form of the invention wherein the inlet valve, injection nozzle and glow plug are all shown in side elevation and the valve port is sectioned along the valve axis.
Figures 2, 3:
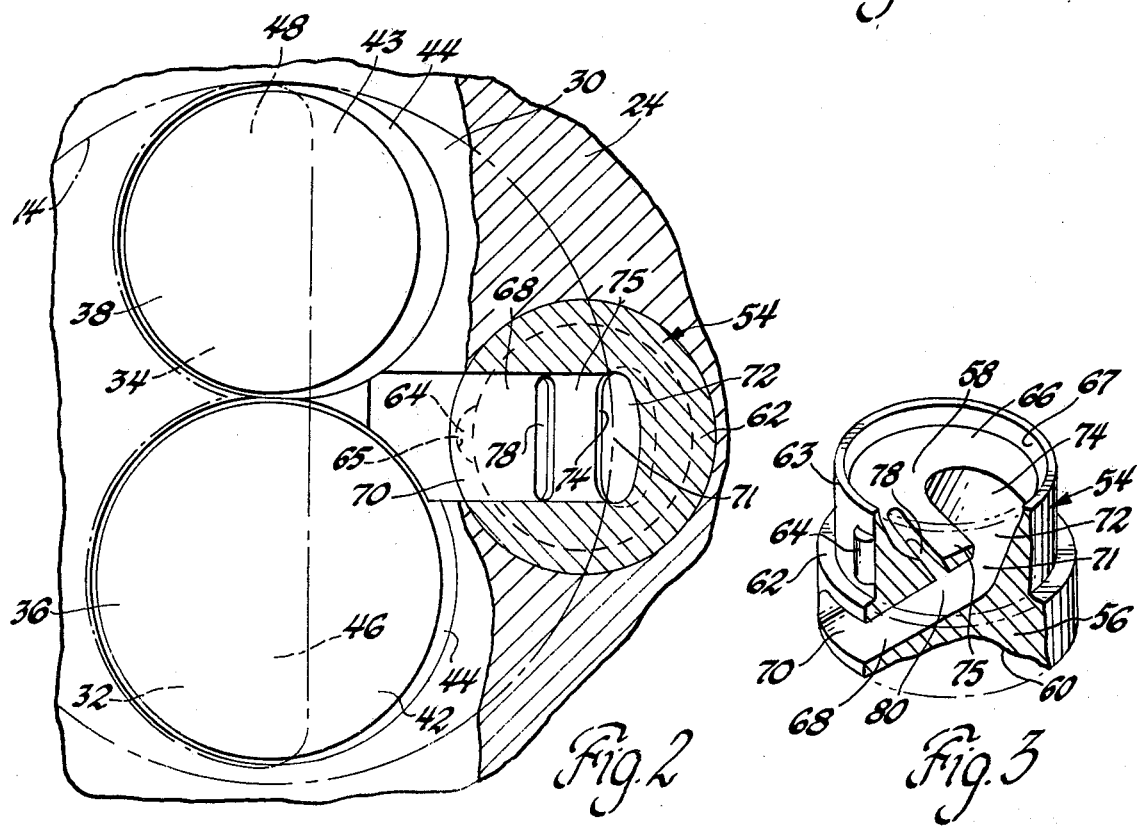
FIG. 2 is a cross sectional view through the combustion chamber of the disclosed embodiment taken generally in the plane indicated by the line 2—2 of FIG. 1.
FIG. 3 is a pictorial view of a prechamber flame cup of a type for use in the disclosed embodiment having portions broken away to show the connecting passage with its primary and secondary openings.

Referring now to the drawing in detail, numeral 10 generally indicates an internal combustion engine of the four-stroke automotive diesel type. Engine 10 is conventionally provided with a cylinder block 12 defining a plurality of cylinders 14 having axes 15, only one of the cylinders being shown. Each of the cylinders opens through an end wall of the cylinder block 12 which defines a flat machined surface 16. Each cylinder has recriprocably disposed therein a piston 18 having the usual piston sealing rings 20 and having a generally flat upper surface 22 which, in the upper position of motion of the piston known as the top dead center position, approximates a location of near alignment with the upper surface 16 of the cylinder block.

At least one cylinder head 24 is mounted on the cylinder block 12 having a generally flat lower surface 26 opposing and sealingly engaging through a gasket 28 the flat upper surface 16 of the cylinder block. The flat head surface 26 also closes the end of each cylinder 14 and, lying opposite the flat piston surfaces 22, defines together with the pistons and cylinders main combustion chambers 30 located at the ends of the cylinders 14.

At each cylinder location the cylinder head 24 is provided with a pair of adjacent ports including an inlet port 32 and exhaust port 34. These ports respectively connect the main combustion chamber 30 with suitable air inlet and exhaust gas discharge systems, not shown. The movement of gas between the ports and the main combustion chamber is controlled respectively by inlet and exhaust poppet valves 36, 38 respectively having heads seatable at the ends of their respective ports to close the ports.

The valves 36, 38 are carried in the head for reciprocating movement on parallel axes 40 which are canted or inclined upwardly away from a plane passing through the cylinder axis 15 and preferably extending longitudinally of the engine. The canting of the valves requires the valve seats 41 in the cylinder head to be recessed on one side, resulting in the formation of wedge-shaped valve recesses 42, 43 which are defined by the bottoms of the valves and the surrounding wall portions 44 tapering into the adjoining flat surface 26 of the cylinder head. These valve recesses are complemented by similar wedge-shaped recesses 46, 48 formed in the flat upper surface of each piston to provide clearance for the initial opening or final closing motion of the heads of the respective valves. The valve recesses in the head and their related recesses in the pistons cooperate to form adjoining and overlapping pancake or disc-like air turbulence valve pockets between the ends of the valves and the tops of the pistons having elevated sides formed largely within the cylinder head.

At each cylinder location, the cylinder head is provided with a precombustion chamber (prechamber) 50 which is located in the head above one edge of the piston and on the side of the inlet and exhaust ports opposite the direction of upward inclination of their valve axes 40. Each precombustion chamber 50 is formed in the head by a recess 52 that extends upwardly from the cylinder head bottom surface 26 and is closed at the bottom by a flame cup insert 54.

The flame cup insert comprises a unitary body having a floor (or bottom wall) portion 56 with upper and lower surfaces 58, 60 respectively and flanged outer edge 62 interference fitted in a complementary portion of the prechamber recess 52 to retain the insert in the head. A portion of the insert floor lower surface 60 opposes the upper surface 16 of the cylinder block and engages the gasket 28 so as to positively retain the insert 54 in the cylinder head after the engine is assembled. The remainder of the insert floor lower surface 60 extends above the cylinder in opposition to the flat upper piston surface 22. It should be noted that the full extent of the lower surface 60 is unbroken by any opening.

Supported on the floor, the unitary flame cup further includes an upstanding cylindrical wall 63, the outer surface of which is conventionally spaced a small amount, not shown, from the corresponding cylindrical portion of the recess 52 to provide an insulating barrier that tends to retain heat in the wall portion 63. A part cylindrical protrusion 64 cast on the exterior of the wall 63 mates with a vertical drilled recess or slot 65 in the wall of the head recess 52 to positively locate the flame cup in the desired position. The interior of the wall 63 is curved and smoothly connected with the upper surface 58 of the floor to define a cup-shaped interior chamber portion 66. At its upper edge 67, the wall interior has a part spherical portion. This portion opens to and blends with the upper portion of the recess 52 which is of part spherical configuration to form the total volume of the precombustion chamber 50.

Those portions of the construction so far described are essentially the same as the comparable portions of the combustion chamber arrangement disclosed in the above-mentioned U.S. Pat. Nos. 4,122,804 and 4,122,805. The improvements of the present invention are embodied in features of the connecting passage and their relations with the injection nozzle and glow plug to be subsequently described, taken together with the above-described features.

The prechamber 50 is connected with the main combustion chamber 30 by a wide and relatively shallow gas connecting and discharge passage in the flame cup portion 56. The passage includes a wide-mouth, generally straight main passage portion 68 that is in substantial alignment with the associated valve pockets and registered with the elevated sides thereof.

Main portion 68 extends laterally in the floor 56 on an axis that preferably lies in a plane approximately at right angles to the longitudinal plane defined by the valve axes. Thus, the main passage portion 68 extends at a slight upward angle between the upper and lower surfaces 58, 60 of the flame cup floor from an opening 70 in the side of the floor that does not break through the lower surface to a junction point 71 beyond the center of the floor. Here, the main passage portion joins with a wide primary opening or throat portion 72 that extends sharply upward toward the interior of the precombustion chamber along the side thereof furthest from the cylinder axis. Throat portion 72 forms an obtuse angle with the main passage portion in the direction of flow toward the prechamber, connecting with the cup-shaped interior portion of the prechamber through an opening 74 in the floor upper surface 58. The positioning and angle of the primary opening portion relative to the main passage portion are chosen to direct and control the rate of air swirl created in the precombustion chamber by the in-flow of air through the passage from the main chamber during the reduction in clearance volume that takes place during the piston compression stroke.

From opening 74, the extension of the prechamber floor primarily back toward the cylinder and valve axes, cause the portion of the floor 56 between it upper surface 58 and the straight main passage portion 68 to form a hot wall 75 heated in operation by combustion gases on both sides. Through this hot wall, there extends a secondary opening or throat portion 78 connecting a portion of the cup-shaped interior chamber 66 near the hot wall with a point 80 of the main passage portion 68 intermediate its opening 70 and its junction point 71 with the primary opening portion 72. This secondary opening or throat portion 78 preferably forms a sharper angle with the main passage portion in the direction of flow into the prechamber than that formed by the primary opening portion, so that entering flow is directed through the primary opening portion in a preferential manner.

In the illustrated embodiment, the secondary opening or throat forms an acute angle with the main passage portion in the direction of inward flow. It is, however, within the contemplation of the invention that the secondary opening or throat portion be normal to or form a slightly obtuse angle with the main passage portion, so long as its angle is sharper than that of the primary opening or throat portion with the main passage portion.

In order to provide a combustible mixture of air and fuel in the precombustion chamber 50, the cylinder head mounts at each cylinder location a fuel injection nozzle 82 which may be of any suitable type but is preferably of the poppet nozzle type that directs a shallow cone-shaped spray of fuel into the precombustion chamber. The nozzle 82 is disposed on an angled axis 84 which lies coplanar with the cylinder axis and extends through the chamber to a point of the hot wall near the location of the secondary opening 78 of the prechamber passage. The injection of fuel generally along the axis 84 combined with the swirl existing in the prechamber at the time of injection, causes a concentrated mixture of fuel and air to be formed in a zone of the prechamber immediately adjacent the position of the secondary opening into the prechamber interior portion 66, at which point the beginning of combustion generally occurs.

To provide for ignition under cold-starting and warm-up conditions, a glow plug 90 is provided at each cylinder location. Each plug 90 is secured in an opening 92 having an axis parallel with the cylinder axis and lying in a common plane with the axis of the injection nozzle. Each glow plug has an elongated end 94 that extends into the prechamber in or near the concentrated zone of air-fuel mixture formed in the path of fuel spray from the injection nozzle toward the hot wall, thus providing a hot spot to aid prompt ignition of the fuel delivered to the prechamber by the injector during engine starting and warm-up.

The arrangement of the fuel injection nozzle and glow plug and the configuration of the flame cup connecting passage, working together, create in the precombustion chamber at the end of the compression stroke a rich-fuel mixture in the zone near the secondary opening, which is ignited by the glow plug or through compression ignition. The resultant combustion creates an increase in pressure which initially causes the first ignited gases to be forced out through the secondary opening to the main passage portion and into the main combustion chamber, followed by the passage of further gases through both the primary and secondary openings to the main passage portion and thence into the main combustion chamber where secondary mixing and further combustion occur.

The rate of swirl in the prechamber at the end of the compression stroke is controlled primarily by the angle of the primary opening portion with the main passage portion due to the shallower angle this construction makes than that which is formed by the secondary opening connection with the main passage portion. Thus, flow into the prechamber is preferentially directed to the primary opening portion and into a swirling pattern controlled by the primary opening toward the top of the prechamber, past the injection nozzle and downwardly past the glow plug toward the hot wall and secondary opening. The combination of controlled swirl and fuel injection direction yields initial combustion in a rich zone near, and an outflow of burning gases through, the the secondary opening to the main combustion chamber, giving improved combustion with a higher degree of secondary mixing that provide greater power and lower particulate emissions than the levels obtained with prior arrangements.

While the invention has been disclosed by reference to a specific preferred embodiment, it should be understood that numerous modifications to the construction and arrangement of the disclosed embodiment could be made without departing from the inventive concepts defined by the following claims, which should be given the full scope permitted by their respective terms.

The embodiments of the invention in which an exclusive property or privilege is claimed are defined as follows:

1. In combination in a diesel engine, means defining a cylinder having an axis, a piston reciprocably carried in the cylinder and a cylinder head having a generally flat lower surface closing the end of the cylinder and defining in cooperation with the piston a main combustion chamber at the end of the cylinder, said cylinder head having adjacent inlet and exhaust ports opening to the combustion chamber and closed by poppet valves having heads and movable on axes inclined upwardly away from and on the same side of a plane passing through the cylinder axis such that the valve heads are canted with respect to the lower surface of the cylinder head so as to form, in closed position, wedge shaped valve recesses in the cylinder head surface, a precombustion chamber formed in the cylinder head on the side of the inlet and exhaust ports opposite the inclination of the valve axes and defined by a recess in the cylinder head closed by a flame cup having a bottom wall with an unbroken lower surface flush with the lower surface of the cylinder head, said valve recesses being connected with said precombustion chamber by a channel extending outwardly from the edges of the deeper portions of the wedge shaped valve recesses to the flame cup and a passage in the bottom wall of the flame cup, opening to said channel through the side of the flame cup bottom wall and extending to the precombustion chamber, said flame cup passage including a main portion extending transversely in the bottom wall from the side opening to a junction point in the wall, a primary opening portion extending upwardly from the junction point into the precombustion chamber at an obtuse angle with the main passage portion so as to direct the gas flow into the precombustion chamber in a manner to control the resulting swirl and turbulence, and the improvement comprising a secondary opening portion extending upwardly at an acute angle with the main passage portion with respect to flow into the precombustion chamber from an intermediate point of said main passage portion between its side opening and the junction point to an interior zone from which to receive the initial outflow of combustion gases passing through said gas passage.

2. The combination of claim 1 and further including a fuel injection nozzle arranged in the cylinder head to direct fuel spray into the precombustion chamber, such fuel spray being directed toward said interior zone generally adjacent the entry of the secondary opening portion into the precombustion chamber.

3. The combination of claim 2 wherein the precombustion chamber and the flame cup passage have axes coplanar with the cylinder axis, and further including a glow plug having an elongated heating element extending into the interior zone of said precombustion chamber, said glow plug element and said fuel injection nozzle being disposed on axes coplanar with the axes of the precombustion chamber and the flame cup passage.

4. In a diesel engine having a cylinder and a cylinder head which includes a precombustion chamber and a flat lower surface closing an end of said cylinder, the combination comprising a flame cup defining a portion of the precombustion chamber and including a continuous upstanding wall, a floor having an upper surface supporting the wall and forming the bottom of the chamber and an unbroken lower surface flush with the cylinder head lower surface, a gas passage through the floor and having a main portion extending at a slight upward angle from an opening in the side of the floor and passing transversely between the upper and lower surfaces of the floor, said main portion connecting with a primary opening portion extending upwardly at an obtuse angle with the main portion through the upper surface of the floor toward an interior point of the chamber in a manner to control swirl therein, and a secondary opening portion extending upwardly at an acute angle with the main passage portion with respect to flow into the chamber from an intermediate point of the main passage portion between its side opening and the point of connection of said main portion with said primary opening portion to an interior zone of said chamber from which to receive an initial outflow of combustion gases through said gas passage, and a channel formed in the cylinder head in alignment with said main portion of the flame cup gas passage and extending downwardly and away from said passage, said channel and passage together forming a smooth path for movement of gases between the precombustion chamber and the cylinder.

5. A flame cup adapted for installation in a diesel engine cylinder head to form part of a precombustion chamber in said head, said flame cup comprising a floor with upper and lower surfaces, the lower surface being unbroken and the upper surface defining an interior chamber portion, and a gas passage through the floor and connecting with the interior chamber portion, said gas passage comprising a main portion opening to the exterior of the floor at one side thereof above the lower surface and extending transversely between the upper and lower surfaces to a junction point in said floor, a primary opening portion extending upwardly from the junction point into the chamber at an obtuse angle with said main passage portion to the interior of the chamber so as to direct gas flow into the chamber in a manner to control the resulting swirl or turbulence and a secondary opening portion extending upwardly at an acute angle with the main passage portion with respect to flow into the chamber from an intermediate point of the main passage portion between its side opening and said junction point, the secondary opening portion extending into the chamber at an interior zone from which to receive an initial outflow of combustion gases into the gas passage.

6. A flame cup adapted for installation in a diesel engine cylinder head to form part of a precombustion chamber in said head, said flame cup comprising a unitary body having a floor with upper and lower surfaces, the latter being unbroken, and a continuous upstanding wall on said floor and having a curved interior surface smoothly connected with the upper surface of said floor to define a cup shaped interior chamber portion, and a gas passage through the floor and connecting with the interior chamber portion, said gas passage comprising a main passage portion opening to the exterior of the floor at one side thereof above the lower surface and extending transversely between the upper and lower surfaces to a junction point in said floor, a primary opening portion extending upwardly from the junction point into the chamber at an obtuse angle with said main passage portion to the interior of the chamber so as to direct gas flow into the chamber in a manner to control the resulting swirl or turbulence, and a secondary opening portion extending upwardly at an acute angle with the main passage portion with respect to flow into the chamber from an intermediate point of the main passage portion between its side opening and said junction point, the secondary opening portion extending into said chamber at an interior zone from which to receive an initial outflow of combustion gases into the gas passage.

7. A flame cup adapted for installation in a diesel engine cylinder head to form part of a precombustion chamber in said head, said flame cup comprising a floor with upper and lower surfaces, the upper surface defining an interior chamber portion, and a gas passage through the floor and connecting with the interior chamber portion, said gas passage comprising a main portion having a lower opening to the exterior of the floor and extending transversely between the upper and lower surfaces to a junction point in said floor, a primary opening portion extending upwardly from the junction point into the chamber at an obtuse angle with said main passage portion to the interior of the chamber so as to direct gas flow into the chamber in a manner to control the resulting swirl or turbulenece, and a secondary opening portion extending upwardly at an acute angle with respect to flow into the chamber from an intermediate point of the main passage portion between its lower opening and said junction point, the secondary opening portion extending into the chamber at an interior zone from which to receive an initial outflow of combustion gases into the gas passage.

8. A flame cup adapted for installation in a diesel engine cylinder head to form part of a precombustion chamber in said head, said flame cup comprising a floor with upper and lower surfaces, the upper surface defining an interior chamber portion, and a gas passage through the floor and connecting with the interior chamber portion, said gas passage comprising a main portion having a lower opening to the exterior of the floor and extending transversely between the upper and lower surfaces to a primary opening portion extending to the interior of the chamber, and a secondary opening portion extending only upwardly at an acute angle with the main passage portion with respect to flow into the chamber from an intermediate point of the main passage portion, the secondary opening portion extending into the chamber at an interior zone from which to receive an initial outflow of combustion gases into the gas passage.

* * * * *

UNITED STATES PATENT AND TRADEMARK OFFICE
CERTIFICATE OF CORRECTION

PATENT NO. : 4,270,499

DATED : June 2, 1981

INVENTOR(S) : Arthur R. Frelund

It is certified that error appears in the above—identified patent and that said Letters Patent is hereby corrected as shown below:

Col. 1, line 39, "specfic" should read -- specific --.

Col. 1, line 60, "seocondary" should read -- secondary --.

Col. 2, line 14, "openings" should read -- opening --.

Col. 2, line 60, "recriprocably" should read -- reciprocably --.

Col. 3, line 33, "turburlence" should read -- turbulence --.

Col. 4, line 18, after "cup" insert -- floor --.

Col. 4, line 49, "cause" should read -- causes --.

Col. 5, line 53, "construction" should read -- connection --.

Claim 7, Col. 8, line 34, "turbulenece" should read -- turbulence --.

Signed and Sealed this

Twenty-second Day of September 1981

[SEAL]

Attest:

GERALD J. MOSSINGHOFF

Attesting Officer

Commissioner of Patents and Trademarks